Sept. 3, 1946.            D. B. ERMINGER            2,407,067
                    SERVICE INSPECTION MANUAL
                       Filed Sept. 25, 1944
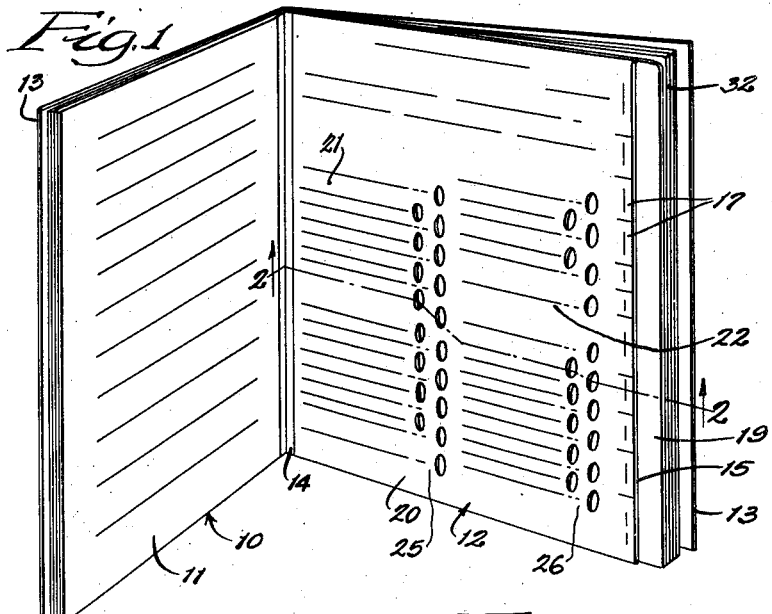
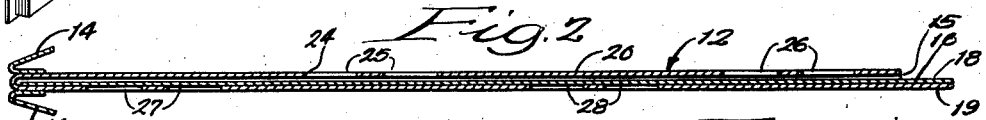
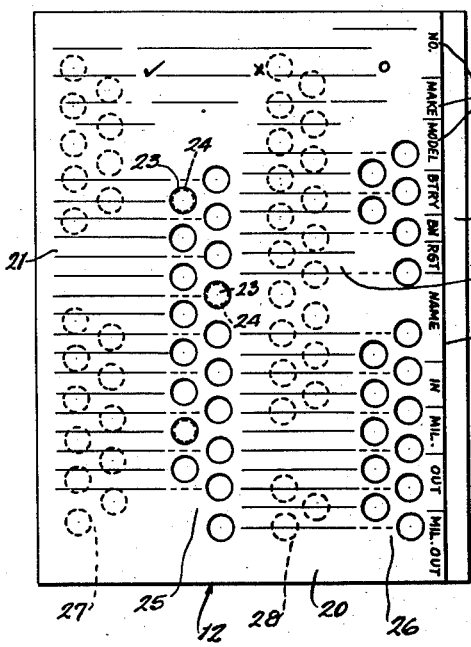
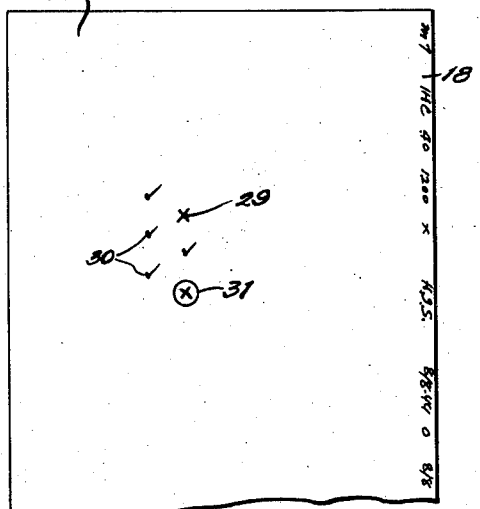
Inventor:
Durward B. Erminger,
By Paul O. Pippel
Attorney.

Patented Sept. 3, 1946

2,407,067

UNITED STATES PATENT OFFICE 2,407,067

SERVICE INSPECTION MANUAL

Durward B. Erminger, Maywood, Ill., assignor to International Harvester Company, a corporation of New Jersey Application September 25, 1944, Serial No. 555,622

4 Claims. (Cl. 281—44)

This invention relates to a new and improved service inspection manual for trucks or other vehicles.

An important object of this invention is to provide a service inspection manual to be used by the operator of a fleet of trucks. All truck owners have different ideas as to the type and amount of periodic inspection necessary to proper vehicle maintenance. The subject service inspection manual is prepared by the vehicle manufacturer to satisfy all conditions and provides complete information on the proper inspection, service and repair of the vehicle. One of these manuals should accompany each truck or vehicle that is sold.

Another important object is to provide a service inspection manual for vehicle owners which is arranged so that the owner may select the service and inspection he desires to have made on the vehicle during intervals in the use and operation of the vehicle.

A further important object is the provision of an envelope pocket capable of receiving a removable insert upon which inspection reports may be recorded.

A still further important object is to provide an envelope having a record sheet inserted therein, a series of inspection and service items listed on the front and rear of the envelope, and apertures adjacent the several items for the purpose of recording the inspection on the record sheet inserted in the envelope.

Another and still further object is the provision of means whereby an owner of a vehicle may at his own election make apertures in the insertion envelope opposite only those items on which he desires service and inspection to be made.

It is customary in the trade for companies carrying on a trucking business to rent their trucks from individual truck owners. It is a further custom for the trucking companies to employ drivers for the trucks, but it is the responsibility of the truck owners to have the trucks properly serviced. Such service generally is made after the trucks have traveled a certain mileage such as five-hundred, a thousand, or five-thousand miles. Inspections and service cannot be made at one service station inasmuch as a good many trucks on the roads today travel across the country, and it is very often the situation that the truck is a thousand or more miles from its home station when one of the regular service check-ups is due. The service inspection manual of this invention always accompanies the truck, and no matter where the inspection is made it will always be uniform and will be exactly the inspection desired by the truck owner. The driver who is not generally in the owner's employ need not concern himself with the type of inspection and service to be given to each individual truck he may be driving but simply pulls out the service inspection manual and gives it to the garage mechanic for his guidance in making the service inspection.

Other and further important objects will become apparent from the following specification and accompanying drawing, in which:

Figure 1 is a perspective view showing the service inspection manual of this invention;

Figure 2 is a sectional view taken on the line 2—2 of Figure 1;

Figure 3 is a front elevational view of the inspection envelope manual of this invention; and Figure 4 is a front view of a removable insert to be used in connection with the envelope shown in Figure 3.

As shown in the drawing, the reference numeral 10 indicates generally a manual comprising a series of pages 11, an envelope 12 preferably made of waterproof material, and a relatively stiff cover 13. The subject-matter on pages 11 consists of technical information relating to the vehicle for which the manual is supplied.

The envelope 12 is fastened in the manual by means of strips of adhesive tape or the like 14, as best shown in Figures 1 and 2. The opening for the envelope 12 is at the side of the manual as shown at 15. The envelope 12 is adapted to receive an insert sheet 16 shown in Figure 4.

As best shown in Figure 3, the envelope 12 on its face includes a space at the top thereof for the make and model of vehicle and other necessary identification. Along the right-hand side of the envelope is provided a series of identification items 17, which are to be answered and written on the right-hand edge 18 of the insert sheet 16. This right-hand edge 18 of the insert sheet 16 projects out from the mouth 15 of the envelope so that it covers a projecting back portion 19 of the envelope. The front face 20 of the envelope 12 terminates slightly inwardly of the back portion 19 so that the edge 18 of the insert sheet will be exposed when the insert 16 is completely within the envelope 12. The projecting back portion 19 forms a stiff backing so that it is easy to write on the edge 18 of this insert sheet to answer the question items 17. These items are make of vehicle, model, number, name, etc. The insert sheet 16 is preferably a blank sheet, and hence it is necessary to have this identification on the sheet when it is removed from the manual and deposited in office files.

Inspection and service steps are illustrated in the order in which they should be made down the face of the envelope at 21. These inspection steps are continued in a second column 22 on the face of the envelope and are further continued on the back of the envelope. These steps take the form of checking tires, battery, fuel level, coolant level, brakes, clutch, ignition, engine, spark plugs, valves, generator, governor, etc. Opposite each step in the service and inspection listing is a circular disk 23 having perforations 24 around its periphery in the face 29 of the envelope 12. In place of perforations the periphery may be scored to facilitate removal. A new owner of a truck or other vehicle having one of these service manuals has the duty of deciding the particular service and inspection he desires to have made at the several stages of periodic check-ups; for example, at the five-hundred-mile inspection, this particular owner may not want to check anything more than the tires and fuel. In such event, that owner will remove the perforated disks adjacent the items tires and fuels. It is evident that after removal of these disk-like plugs, the insert sheet 16 will then be exposed to the face of the envelope. Instructions for proceeding with the inspection are simple and are listed at the top of the envelope so that regardless of what service man makes the inspection, it will be made uniformly. Continuing with the former example, assuming that the amount of air in the tires is less than it should be, the inspector will put an X in the space left by the removed disk, which as before stated has exposed the insert sheet 16. If after inspection of the tires the inspector finds that they are low on air and he has the means for remedying this deficiency, he should do so and then draw a circle around the previously made X indicating that the repairs have been made. If the fuel level is found to be sufficiently high and no additional fuel is deemed necessary, then a check mark is made indicating that the inspection has been made but no additional fuel was necessary. Another owner of the same truck might desire numerous other inspections for this same period, such as washing the vehicle, lubricating the vehicle, servicing the carburetor and air cleaner, and numerous other points of service. That owner would remove additional perforated disks adjacent to the additional items he wants serviced, and when the truck or vehicle is brought into a "foreign" service station, the mechanic making the inspection will know exactly what service steps the owner desires. If an owner or truck operator decides that certain inspections are no longer necessary he may cover the aperture or apertures, as the case may be, with pieces of tape or the like.

The perforated disks 23 are in alined columns 25 and 26 on the front face of the envelope 29. The perforated disks 23 on the back face of the envelope 12 are in columns 27 and 28 offset respectively from the columns 25 and 26 on the front face, so that when the inspector is making notations on the insert sheet 16 through the removed disks 23 he will always have a proper backing behind the removed disk thereby eliminating tearing of the insert sheet 16. In view of the fact that the mechanic's hands are usually greasy, the envelope is made of material that is washable and the grease may be removed by sponging the envelope with gasoline or other cleaning fluid.

The driver of the vehicle removes the insert sheet 16 and turns it over to the owner of the vehicle who has a master envelope he can use to determine what service was necessary while the truck was on the road and also to complete repairs that were necessary but which the "foreign" service man was unable to perform. Such incompleted repairs will appear as uncircled Xs on the insert sheet, as designated by the numeral 29. The check marks 30 or the circled Xs 31 indicate that service was not necessary or was necessary and has been made.

The inspection sheets 16 are preferably a standard size of paper, but in order to eliminate any possibility of a service man not having an insert sheet, such sheets are provided in the back of the manual 10 as indicated by the numeral 32. The inner edges of these pages or insert sheets 32 are perforated so that they may be easily removed when it is necessary to have such an insert sheet for recording of the inspection and the service.

The intention is to limit the invention only within the scope of the appended claims.

What is claimed is:

1. An envelope pocket having front and rear faces, a series of service and inspection items listed on the faces of said envelope pocket, the rear face of the envelope projecting beyond the front face, and an insert sheet adapted to fit in said envelope pocket and extend to the outer edge of the rear projecting face, whereby written notations may be made on the strip of extending insert sheet with the aid of the backing by the rear face of the envelope.

2. An envelope pocket having front and rear faces, a series of service and inspection items listed on the faces of said envelope pocket, said envelope having plugs in the faces adjacent each of said items, said plugs having perforations around their outer peripheries, whereby any of the plugs may be removed as desired, and a sheet adapted to be inserted in said envelope pocket and have marks made thereon through the removed plugs, said plugs in the front face being offset from the plugs in the rear face, whereby the inserted sheet will have a backing at the place of each one of the removed plugs.

3. An envelope having front and rear faces, and service and inspection items listed in columns on the faces of said envelope, said envelope faces having circular disks perforated around their outer edges in the faces of the envelope adjacent each of said items, whereby any of the disks may be removed as desired, said circular disks being arranged in vertical columns, said columns of disks on the front face being offset from the columns of disks on the rear face.

4. An envelope having front and rear faces, service and inspection items listed in columns on the faces of said envelope, said envelope faces having circular disks perforated around their outer edges in the faces of the envelope adjacent each of said items, whereby any of the disks may be removed as desired, said circular disks being arranged in vertical columns, said columns of disks on the front face being offset from the columns of disks on the rear face, and an insert sheet adapted to fit in said envelope for the purpose of marking said sheet through removed circular disks.

DURWARD B. ERMINGER.